(12) United States Patent
Taniguchi et al.

(10) Patent No.: US 11,812,806 B2
(45) Date of Patent: Nov. 14, 2023

(54) FUNCTIONAL FABRIC AND METHOD FOR PRODUCING FUNCTIONAL FABRIC

(71) Applicant: AS CORPORATION, Osaka (JP)

(72) Inventors: Ayanobu Taniguchi, Kanagawa (JP); Shigeru Nohara, Osaka (JP); Tomo Tsukiyama, Osaka (JP)

(73) Assignee: AS CORPORATION, Osaka (JP)

( * ) Notice: Subject to any disclaimer, the term of this patent is extended or adjusted under 35 U.S.C. 154(b) by 452 days.

(21) Appl. No.: 16/619,018

(22) PCT Filed: May 29, 2018

(86) PCT No.: PCT/JP2018/020491
§ 371 (c)(1),
(2) Date: Dec. 3, 2019

(87) PCT Pub. No.: WO2018/225580
PCT Pub. Date: Dec. 13, 2018

(65) Prior Publication Data
US 2020/0100549 A1 Apr. 2, 2020

(30) Foreign Application Priority Data

Jun. 9, 2017 (JP) ................................. 2017-114457

(51) Int. Cl.
*A41D 31/102* (2019.01)
*A41D 31/10* (2019.01)
(Continued)

(52) U.S. Cl.
CPC ......... *A41D 31/102* (2019.02); *A41D 31/065* (2019.02); *A41D 31/10* (2019.02);
(Continued)

(58) Field of Classification Search
None
See application file for complete search history.

(56) References Cited

U.S. PATENT DOCUMENTS 3,809,077 A * 5/1974 Hansen .................. A61B 46/40
128/849
4,715,235 A * 12/1987 Fukui ...................... G01D 5/16
600/595
(Continued)

FOREIGN PATENT DOCUMENTS

CA 2609588 A * 11/2006
EP 1437438 A * 7/2004
(Continued)

OTHER PUBLICATIONS

Dupont Hytrel Thermoplastic Polyester Elastomer Product Reference Guide. (Sep. 2015) (Year: 2015).*
(Continued)

*Primary Examiner* — Vivian Chen
(74) *Attorney, Agent, or Firm* — Stephen J. Weyer; Stites & Harbison, PLLC

(57) ABSTRACT

A functional fabric is formed by bonding a polyester synthetic resin film mixed with carbon black fine particles to a fabric, in which the synthetic resin film is non-porous and has a thickness of 10 μm to 20 μm. The functional fabric is produced by producing a polyester synthetic resin film mixed with carbon black fine particles and bonding the synthetic resin film to a fabric, and the produced functional fabric is entirely or partially bonded to an inner wear or an intermediate clothes to produce clothing.

7 Claims, 1 Drawing Sheet

(51) Int. Cl.
| | |
|---|---|
| *A41D 31/06* | (2019.01) |
| *B32B 27/12* | (2006.01) |
| *B32B 27/18* | (2006.01) |
| *B32B 27/36* | (2006.01) |
| *D06M 11/74* | (2006.01) |
| *D06M 15/507* | (2006.01) |
| *A41B 1/08* | (2006.01) |
| *D04B 1/24* | (2006.01) |
| *D04B 21/20* | (2006.01) |
| *D06M 101/06* | (2006.01) |
| *D06M 101/32* | (2006.01) |
| *B32B 7/14* | (2006.01) |
| *B32B 37/12* | (2006.01) |
| *B32B 7/12* | (2006.01) |
| *A41D 13/00* | (2006.01) |
| *A41D 31/02* | (2019.01) |
| *B32B 5/02* | (2006.01) |
| *A41D 3/04* | (2006.01) |
| *A41B 9/12* | (2006.01) |
| *B32B 27/20* | (2006.01) |
| *B32B 27/02* | (2006.01) |
| *A41D 31/04* | (2019.01) |

(52) U.S. Cl.
CPC .......... *B32B 27/02* (2013.01); *B32B 27/18* (2013.01); *B32B 27/36* (2013.01); *D06M 11/74* (2013.01); *D06M 15/507* (2013.01); *A41B 1/08* (2013.01); *A41B 9/12* (2013.01); *A41B 2400/22* (2013.01); *A41B 2500/10* (2013.01); *A41B 2500/52* (2013.01); *A41B 2500/54* (2013.01); *A41D 13/00* (2013.01); *A41D 31/02* (2013.01); *A41D 31/04* (2019.02); *A41D 2400/10* (2013.01); *A41D 2500/52* (2013.01); *A41D 2500/54* (2013.01); *B32B 5/02* (2013.01); *B32B 7/12* (2013.01); *B32B 7/14* (2013.01); *B32B 27/20* (2013.01); *B32B 37/12* (2013.01); *B32B 2250/02* (2013.01); *B32B 2264/108* (2013.01); *B32B 2307/304* (2013.01); *B32B 2307/702* (2013.01); *B32B 2307/724* (2013.01); *B32B 2307/7265* (2013.01); *B32B 2367/00* (2013.01); *B32B 2437/00* (2013.01); *D04B 1/246* (2013.01); *D04B 21/207* (2013.01); *D06M 2101/06* (2013.01); *D06M 2101/32* (2013.01); *D06M 2200/12* (2013.01); *D10B 2331/04* (2013.01)

(56) References Cited

U.S. PATENT DOCUMENTS

| | | | | | |
|---|---|---|---|---|---|
| 4,725,481 | A | * | 2/1988 | Ostapchenko | B32B 27/285 528/343 |
| 4,801,491 | A | * | 1/1989 | Tanaka | B32B 7/12 442/287 |
| 4,908,260 | A | * | 3/1990 | Dodia | B32B 25/04 428/920 |
| 4,935,287 | A | * | 6/1990 | Johnson | B32B 27/12 428/152 |
| 5,043,209 | A | * | 8/1991 | Boisse | B32B 27/32 442/403 |
| 5,445,874 | A | * | 8/1995 | Shehata | B32B 27/12 442/287 |
| 5,484,632 | A | * | 1/1996 | Mercer, Jr. | C08J 5/18 528/307 |
| 5,643,991 | A | * | 7/1997 | Stipe | C08L 67/02 524/505 |
| 5,705,555 | A | * | 1/1998 | Guilfoy | C08K 3/04 524/495 |
| 5,859,083 | A | * | 1/1999 | Spijkers | C08K 3/04 521/149 |
| 5,958,567 | A | * | 9/1999 | Wakabayashi | C08J 5/18 528/308 |
| 6,187,696 | B1 | * | 2/2001 | Lim | B32B 27/12 442/77 |
| 6,534,585 | B1 | * | 3/2003 | Dijkstra | C08K 5/3435 524/495 |
| 6,846,440 | B2 | * | 1/2005 | Flynn | C08L 67/02 264/300 |
| 8,697,223 | B2 | * | 4/2014 | Schroer | B32B 33/00 428/137 |
| 2002/0012807 | A1 | * | 1/2002 | Kurian | B32B 27/36 264/211.13 |
| 2002/0160674 | A1 | * | 10/2002 | Kinkelin | C09J 167/025 442/76 |
| 2003/0021945 | A1 | * | 1/2003 | Kelch | C08J 5/18 525/383 |
| 2004/0016912 | A1 | * | 1/2004 | Bandyopadhyay | H01B 1/24 252/500 |
| 2004/0121678 | A1 | * | 6/2004 | Baldwin, Jr. | B32B 37/1207 442/364 |
| 2007/0007495 | A1 | * | 1/2007 | Hayes | H01B 1/24 252/500 |
| 2009/0206067 | A1 | * | 8/2009 | Foss | H05B 3/14 428/688 |
| 2010/0029837 | A1 | * | 2/2010 | Palmer | C08K 5/13 525/419 |
| 2010/0206863 | A1 | * | 8/2010 | Ritter | D06M 11/74 219/202 |
| 2011/0135884 | A1 | * | 6/2011 | Lettow | H05K 1/095 977/734 |
| 2011/0275743 | A1 | * | 11/2011 | Ishii | C08K 5/16 524/133 |
| 2012/0181487 | A1 | * | 7/2012 | Gibon | C08L 77/02 977/734 |
| 2015/0079863 | A1 | * | 3/2015 | Majumdar | D06M 15/195 252/520.5 |
| 2016/0039189 | A1 | * | 2/2016 | Xing | B32B 5/08 428/41.8 |
| 2017/0116889 | A1 | * | 4/2017 | Kasper | C09D 167/00 |

FOREIGN PATENT DOCUMENTS

| | | |
|---|---|---|
| JP | A-1990072941 | 3/1990 |
| JP | 2002-327310 | 11/2002 |
| JP | 2003-319722 | 11/2003 |
| JP | A-2004-346193 | 12/2004 |
| JP | 2005-105493 | 4/2005 |
| JP | A-2014-005372 | 1/2014 |
| JP | A-2017-036221 | 2/2017 |
| WO | WO 92/05308 A * | 4/1992 |

OTHER PUBLICATIONS

International Search Report for PCT/JP2018/020491, dated Jun. 22, 2018.
Written Opinion of the International Searching Authority for PCT/JP2018/020491, dated Jun. 22, 2018.

* cited by examiner

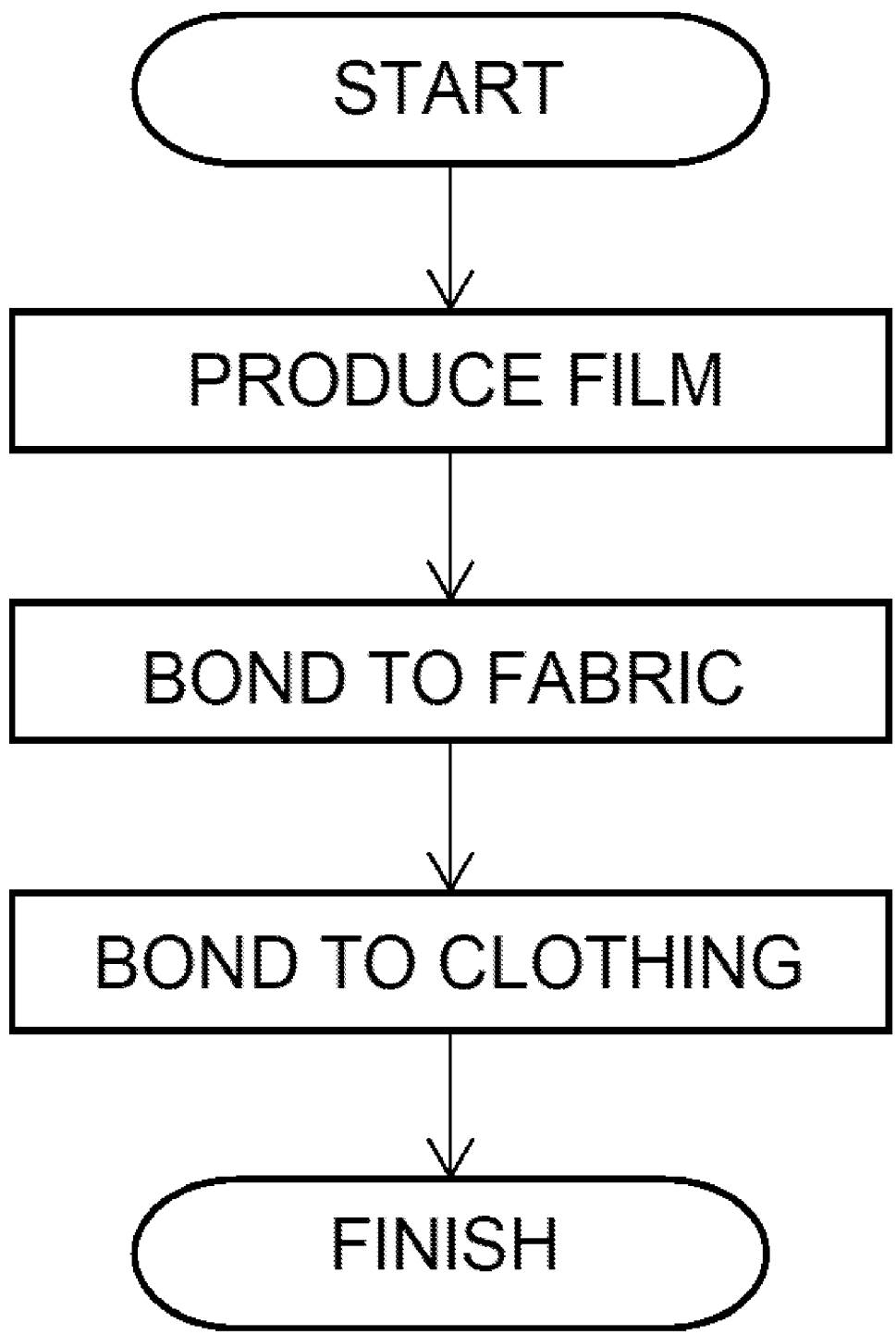

FUNCTIONAL FABRIC AND METHOD FOR PRODUCING FUNCTIONAL FABRIC

TECHNICAL FIELD

The present invention relates to a fabric having windproof, waterproof, moisture permeability, and heat retention functions, and a method for producing the same.

BACKGROUND ART

In clothing for cold protection in the fall and winter seasons, efforts are made to maintain warmth by various methods. Well-known methods include heat insulation, far-infrared absorption, and radiant heat retention using reflection for improving heat retention performance. Further, there are also garments enhancing each function required by a method such as hygroscopic heat releasing heat retention using a kinetic energy release action by moisture absorption.

Many fall and winter clothes, which emphasize aesthetics such as appearance, design, or color, and lightweight and have excellent exercise performance while maintaining these functions such as heat retention, so called clothes having "thin, light, and warm" concepts, is on the market.

It is fashionability and functionality that are required when the clothes is worn in daily life, but for applications such as mountain climbing and outdoor activities, and for exercise applications, it may be required to further add another function. In this case, clothes according to the external environment and the application are required, and wears are added each time. Clothing which fits the purpose of protecting the body from external stimuli, such as so-called cold protection, windproof, and waterproof, is selected, and for outer clothing, inner clothing, and under-wear (inner clothing) also, it is necessary to select additional functions suitable for each application.

There are uses which do not require much exercise, such as commuting and attending school, or there is a need for a wear having windproof, waterproof, and water repellent functions which can withstand bad weather such as storms, extreme cold, and snowfall, for example, mountain climbing. Functions considering the ease of outdoor movement, such as fishing and farming, may be required, and various application developments can be considered.

In this regard, for example, Patent Literature 1 discloses a wear composed of a laminated adhesive body of a raised fabric or a pile fabric and a moisture-permeable polymer film, in which the moisture-permeable polymer film is laminated and adhered to a raised surface or a pile surface of the fabric through a curing reaction type adhesive, a weight of the wear is 50 to 400 g per 1 m², an application amount of the adhesive is 2 to 30 g per 1 m², and a moisture-permeable polymer film surface is disposed on the front side of the wear.

CITATION LIST

Patent Literature

Patent Literature 1: JP 2002-327310 A

SUMMARY OF INVENTION

Technical Problem

When sweating occurs due to physical exercise, it is necessary to discharge, out of a garment, moisture (water vapor) and the like from the body as soon as possible and adjust the temperature inside the garment and a skin surface temperature. A necessary condition for garments worn on the body is to retain (maintain) body temperature, and in summer, it is also important to prevent the inconvenience caused by discharging sweat for controlling an increase in body temperature and suppressing skin surface temperature by moisture vaporization while sweat chilling, and the like. Further, it may also be required to warm up the body and relax muscles as seen during warm-up before a real game, such as marathon athletes and various athletes.

However, there is a problem that it is difficult to satisfy all the functions of windproof, waterproof, moisture permeability, and heat retention, for the wear of Patent Literature 1.

Then, the present invention has been made in view of this problem, and an object of the present invention is to provide a functional fabric having windproof, waterproof, moisture permeability, and heat retention functions. Further, another object of the present invention is to provide a method for producing a functional fabric having these functions.

Solution to Problem

In order to solve the above problem, the functional fabric according to the present invention includes a fabric and a synthetic resin film bonded to the fabric, the synthetic resin film being made of polyester and mixed with carbon black fine particles.

Here, the synthetic resin film is preferably non-porous, and a thickness of the synthetic resin film is preferably 10 µm to 20 µm.

A method for producing a functional fabric according to the present invention includes producing a synthetic resin film being made of polyester and mixed with carbon black fine particles, and bonding the synthetic resin film to a fabric.

Then, when the clothing includes the functional fabric and an inner wear or an intermediate clothes to which the functional fabric is entirely or partially bonded, the clothing having excellent windproof, waterproof, moisture permeability, and heat retention functions can be realized.

Advantageous Effects of Invention

As described above, according to the functional fabric according to the present invention, a functional fabric having windproof, waterproof, moisture permeability, and heat retention functions can be obtained.

BRIEF DESCRIPTION OF DRAWINGS

FIG. 1 is a drawing illustrating a procedure for producing clothing including a functional fabric according to an embodiment of the present invention.

BRIEF DESCRIPTION OF EMBODIMENTS

Hereinafter, a functional fabric according to the present invention and a method for producing the same will be described.

The functional fabric of the present embodiment is obtained by bonding a synthetic resin film having a composition of 100% polyester to an entire surface or a part of a fabric, and exhibits windproof, waterproof, moisture permeability, and heat retention functions. The synthetic resin film is not made of a urethane resin or a polytetrafluoroethylene resin, but is completely non-porous and has a composition of 100% polyester.

The above performance can be retained by controlling the thickness of the synthetic resin film to 10 μm to 20 μm. When the thickness of the film is less than 10 μm, an effect of movement and stretch properties on the thin and interlocked fabric may be small, but on the other hand, there is a problem with the strength of the film itself and the film may be torn, and a bonding work to the fabric may be affected. On the other hand, when the thickness is 20 μm or more, strength is maintained, but wearability of clothes (clothing) to be worn is stiff, and comfort may be impaired. Therefore, the thickness of the film is most suitably 10 μm to 20 μm.

The synthetic resin film is not a polyurethane resin laminate film, but has a composition of 100% polyester. Therefore, the synthetic resin film has excellent weather resistance against ultraviolet rays or wind and rain containing chemical substances such as acid and alkaline substances, and suppresses deterioration and embrittlement when exposed to ultraviolet rays or wind and rain like a polyurethane resin film. Further, since the film is non-porous, it is possible to retain appropriate film strength.

The synthetic resin film is non-porous, but also has excellent moisture permeability and can discharge sweat water vapor from the body to the outside. In addition, the film has excellent windproof and waterproof properties. It is known that water droplets such as rain have a size of 100 to 6000 μm and water vapor has a size of 0.4 nm (4 Å), but the synthetic resin film has a windproof performance of 0.3 cc/cm²/sec. It is known that ordinary knit underwear has an air permeability of 150 to 250 cc/cm²/sec, and a high-density fabric has an air permeability of 30 to 50 cc/cm²/sec. Further, the water resistance of the film is 25000 mm at which a general reference (criterion) can be retained. Incidentally, an umbrella needs 250 mm, light rain and light snow needs 5000 mm, ski golf wear needs 10000 mm, and mountain climbing needs 20000 mm of the water resistance. This synthetic resin film exceeds any of these reference values, and the moisture permeability can be retained at 26300 g/m²~h.

The synthetic resin film is mixed with carbon black fine particles having a function of re-reflecting infrared rays in the film, whereby the synthetic resin film can more effectively exhibit the heat retention function. Re-reflection of infrared rays means that infrared rays emitted from the human body are reflected toward the human body. The carbon black fine particles re-reflect infrared rays and act inward, that is, on the body side, so that the heat retention effect can be enhanced without releasing the heat of the body.

The following is experimental results showing a difference in film performance between the case in which the synthetic resin film is mixed with titanium oxide and the case in which the synthetic resin film is mixed with carbon black fine particles.

<Thermal re-radiation characteristics>White (mixed with titanium oxide fine particles)

"Test method"

Rules acknowledged by (one association) Far Infrared Rays Association, re-radiation characteristics 45 degree parallel re-radiation method
  Measurement location, measurement surface . . . surface
  Number of stacked sheets: 1 sheet "Test results"

ΔT = 0.3° C.   (significant difference at 95% confidence limit (Pr: 0.05))

"Test sample"

| Sample | Weight: 16.0 g/m² Thickness: 0.02 mm (initial load 23.5 kPa) |
|---|---|
| Blank (comparison) | Weight: 95.8 g/m² Thickness: 0.22 mm (initial load 23.5 kPa) |

TABLE 2

| | t(s) | 15 | 30 | 60 | 120 | T∞ |
|---|---|---|---|---|---|---|
| | 1/t | 0.067 | 0.033 | 0.017 | 0.008 | 0 |
| Blank left | 1 | 23.6 | 24.1 | 24.6 | 25.2 | 25.1 |
| | 2 | 23.8 | 24.1 | 24.6 | 25.2 | 25.1 |
| | 3 | 23.8 | 24.2 | 24.7 | 25.2 | 25.2 |
| | 4 | 24.0 | 24.3 | 24.7 | 25.4 | 25.3 |
| | 5 | 24.1 | 24.5 | 24.9 | 25.4 | 25.4 |
| | Average | 23.8 | 24.2 | 24.7 | 25.3 | 25.2 |
| Sample right | 1 | 25.3 | 25.6 | 26.1 | 26.7 | 26.6 |
| | 2 | 25.4 | 25.7 | 26.3 | 26.9 | 26.8 |
| | 3 | 25.3 | 25.7 | 26.1 | 26.7 | 26.6 |
| | 4 | 25.4 | 25.7 | 26.2 | 26.8 | 26.7 |
| | 5 | 24.3 | 24.8 | 25.1 | 25.7 | 25.6 |
| | Average | 24.2 | 24.6 | 25.0 | 25.6 | 25.5 |

TABLE 3

| ΔTn∞ | 1 | 0.5 |
|---|---|---|
| | 2 | 0.3 |
| | 3 | 0.1 |
| | 4 | 1.3 |
| | 5 | 0.2 |
| Average (Δt) | | 0.3 |
| Standard deviation | | 0.15 |
| To = | | 3.94 |

TABLE 4

| | t(s) | 15 | 30 | 60 | 120 | T∞ |
|---|---|---|---|---|---|---|
| | 1/t | 0.067 | 0.033 | 0.017 | 0.008 | 0 |
| Sample left | 1 | 25.3 | 25.6 | 26.1 | 26.7 | 26.6 |
| | 2 | 25.4 | 25.7 | 26.3 | 26.9 | 26.8 |

TABLE 1

<Film performance> White (mixed with titanium oxide)

| Appearance | Thickness | Transparency (A-1) | Transparency (B-1) | Water resistance | Melting point | Embrittlement temperature | (MD/TD) Breaking strength | (MD/TD) Breaking elongation | Coefficient of friction |
|---|---|---|---|---|---|---|---|---|---|
| White | 18 μm | 5400 | 32000 | 25000 | 196° C. | ,<−65 | 22/25 | 530/810 | 0.21 |

TABLE 4-continued

| | | t(s) | 15 | 30 | 60 | 120 | T∞ |
|---|---|---|---|---|---|---|---|
| | | 1/t | 0.067 | 0.033 | 0.017 | 0.008 | 0 |
| | 3 | | 25.3 | 25.7 | 26.1 | 26.7 | 26.6 |
| | 4 | | 25.4 | 25.7 | 26.2 | 26.8 | 26.7 |
| | 5 | | 25.5 | 25.8 | 26.4 | 27.0 | 26.9 |
| | Average | | 25.4 | 25.7 | 26.2 | 26.8 | 26.7 |
| Blank right | 1 | | 25.0 | 25.4 | 25.9 | 26.5 | 26.4 |
| | 2 | | 25.0 | 25.3 | 25.8 | 26.5 | 26.3 |
| | 3 | | 25.3 | 25.7 | 26.1 | 26.7 | 26.6 |
| | 4 | | 25.1 | 25.5 | 26.0 | 26.6 | 26.5 |
| | 5 | | 25.3 | 25.7 | 26.1 | 26.7 | 26.7 |
| | Average | | 25.1 | 25.5 | 26.0 | 26.6 | 26.5 |

TABLE 5

| T table value Pr | Degree of freedom (n · 1) t |
|---|---|
| 0.1 | 2.13 |
| 0.05 | 2.78 |
| 0.01 | 4.60 |

<Thermal re-radiation characteristics>Black (mixed with carbon black fine particles)

"Test method" comparison of cloth bonding and no cloth bonding

Rules acknowledged by (one association) Far Infrared Rays Association, re-radiation characteristics 45 degree parallel re-radiation method Measurement location, measurement surface . . . surface Number of stacked sheets: 1 sheet

| "Test results" |
|---|
| $\Delta T = 0.6°$ C. (significant difference at 99% confidence limit (Pr: 0.01)) |

| "Test sample" | |
|---|---|
| Sample | Weight: 175.6 g/m² Thickness: 0.75 mm (initial load 23.5 kPa) |
| Blank (comparison) | Weight: 164.1 g/m² Thickness: 0.85 mm (initial load 23.5 kPa) |
| Boken Quality Evaluation Institute | |

TABLE 6

| | | t(s) | 15 | 30 | 60 | 120 | T∞ |
|---|---|---|---|---|---|---|---|
| | | 1/t | 0.067 | 0.033 | 0.017 | 0.008 | 0 |
| Blank left | 1 | | 26.5 | 26.9 | 27.4 | 28.1 | 28.0 |
| | 2 | | 26.4 | 26.8 | 27.3 | 27.7 | 27.7 |
| | 3 | | 26.5 | 26.9 | 27.2 | 27.7 | 27.7 |
| | 4 | | 26.6 | 27.0 | 27.4 | 28.0 | 27.9 |
| | 5 | | 26.4 | 26.9 | 27.3 | 28.0 | 27.9 |
| | Average | | 26.5 | 26.9 | 27.3 | 27.9 | 27.8 |
| Sample right | 1 | | 27.1 | 27.7 | 28.3 | 28.9 | 28.9 |
| | 2 | | 26.9 | 27.4 | 27.8 | 28.4 | 28.3 |
| | 3 | | 26.9 | 27.4 | 27.8 | 28.3 | 28.3 |
| | 4 | | 27.1 | 27.6 | 28.0 | 28.7 | 28.6 |
| | 5 | | 26.9 | 27.5 | 28.0 | 28.7 | 28.6 |
| | Average | | 27.0 | 27.5 | 28.0 | 28.6 | 28.5 |

TABLE 7

| $\Delta Tn\infty$ | 1 | 0.6 |
|---|---|---|
| | 2 | 0.6 |
| | 3 | 0.6 |
| | 4 | 0.8 |
| | 5 | 0.7 |
| Average ($\Delta t$) | | 0.6 |
| Standard deviation | | 0.08 |
| To = | | 16.84 |

TABLE 8

| | | t(s) | 15 | 30 | 60 | 120 | T∞ |
|---|---|---|---|---|---|---|---|
| | | 1/t | 0.067 | 0.033 | 0.017 | 0.008 | 0 |
| Sample left | 1 | | 26.8 | 27.4 | 27.9 | 28.4 | 28.4 |
| | 2 | | 26.9 | 27.5 | 27.9 | 28.4 | 28.4 |
| | 3 | | 26.8 | 27.4 | 27.9 | 28.5 | 28.5 |
| | 4 | | 26.9 | 27.5 | 28.0 | 28.5 | 28.6 |
| | 5 | | 26.9 | 27.3 | 28.1 | 28.6 | 28.6 |
| | Average | | 26.8 | 27.4 | 28.0 | 28.5 | 28.5 |
| Blank right | 1 | | 26.7 | 27.2 | 27.5 | 28.0 | 28.0 |
| | 2 | | 26.4 | 27.0 | 27.4 | 27.8 | 27.9 |
| | 3 | | 26.6 | 27.1 | 27.4 | 28.0 | 28.0 |
| | 4 | | 26.4 | 26.9 | 27.3 | 27.9 | 27.8 |
| | 5 | | 26.5 | 26.9 | 27.5 | 28.0 | 28.0 |
| | Average | | 26.5 | 27.0 | 27.4 | 27.9 | 27.9 |

TABLE 9

| T table value Pr | Degree of freedom (n · 1) = 4 t |
|---|---|
| 0.1 | 2.13 |
| 0.05 | 2.78 |
| 0.01 | 4.60 |

In addition, the following shows the experimental results regarding the light absorption and heat retention characteristics (according to Boken Quality Evaluation Institute).

A thermocouple temperature sensor was installed in the central portion of the back surface of a sample (two types of films 15 cm×15 cm), and a temperature change when a sample surface was irradiated with light under the following conditions was measured every minute for 20 minutes.

<Conditions>

Lamp used: Eye lamp (PRF-500WD) manufactured by IWASAKI ELECTRIC CO., LTD.

Irradiation distance: 30 cm

Measurement conditions: after the lamp was irradiated for 10 minutes, measurement was performed for 10 minutes with the lamp turned off.

Measurement environment: 20±2° C., 65±4% RH

Measurement method: samples were measured side by side at the same time (first time), and measured again with the position of the samples changed (second time), and the average of two values was used as the test result.

<Test result 1>

A: white (mixed with titanium oxide fine particles)

B: black (mixed with carbon black fine particles)

TABLE 10

| | Temperature (° C.) | | Temperature difference |
|---|---|---|---|
| Elapsed time (min) | A | B | $\Delta T = A - B$ |
| 0 | 19.9 | 19.9 | 0 |
| 1 | 28.0 | 37.0 | −9.0 |
| 2 | 33.4 | 44.4 | −11.0 |

TABLE 10-continued

| Elapsed time (min) | Temperature (° C.) A | B | Temperature difference ΔT = A − B |
|---|---|---|---|
| 3 | 37.7 | 50.1 | −12.4 |
| 4 | 40.7 | 53.3 | −12.6 |
| 5 | 42.2 | 56.2 | −14.0 |
| 6 | 44.2 | 58.1 | −13.9 |
| 7 | 44.9 | 58.8 | −13.9 |
| 8 | 45.5 | 59.1 | −13.6 |
| 9 | 46.3 | 59.8 | −13.5 |
| 10 | 46.8 | 60.6 | −13.8 |
| 11 | 37.3 | 43.3 | −6.0 |
| 12 | 31.8 | 35.7 | −3.9 |
| 13 | 28.5 | 31.4 | −2.9 |
| 14 | 26.6 | 28.6 | −2.0 |
| 15 | 25.2 | 26.9 | −1.7 |
| 16 | 24.1 | 25.6 | −1.5 |
| 17 | 23.4 | 24.6 | −1.2 |
| 18 | 22.7 | 23.8 | −1.1 |
| 19 | 22.4 | 23.3 | −0.9 |
| 20 | 22.0 | 22.8 | −0.8 |

It was found from the results of the light absorption and heat retention test by the above test method, for a titanium oxide-mixed film (white) and a carbon-mixed film (black), shown in Table 10 that the heat retention of the carbon-mixed film was clearly much better.

<Test result 2>
A: Bonding (carbon film bonding) cloth
B: Cloth without bonding

TABLE 11

| Elapsed time (min) | Temperature (° C.) A | B | Temperature difference ΔT = A − B |
|---|---|---|---|
| 0 | 20.4 | 20.4 | 0.0 |
| 1 | 30.1 | 28.0 | 2.1 |
| 2 | 37.0 | 33.2 | 3.8 |
| 3 | 42.0 | 37.4 | 4.6 |
| 4 | 45.5 | 40.8 | 4.7 |
| 5 | 47.7 | 43.2 | 4.5 |
| 6 | 49.0 | 44.5 | 4.5 |
| 7 | 49.9 | 45.2 | 4.7 |
| 8 | 50.7 | 45.8 | 4.9 |
| 9 | 51.5 | 46.5 | 5.0 |
| 10 | 51.5 | 47.0 | 4.5 |
| 11 | 42.1 | 39.0 | 3.1 |
| 12 | 35.3 | 33.5 | 1.8 |
| 13 | 31.3 | 30.0 | 1.3 |
| 14 | 28.7 | 27.8 | 0.9 |
| 15 | 26.7 | 26.1 | 0.6 |
| 16 | 25.4 | 25.0 | 0.4 |
| 17 | 24.4 | 24.2 | 0.2 |
| 18 | 23.8 | 23.6 | 0.2 |
| 19 | 23.2 | 23.0 | 0.2 |
| 20 | 22.9 | 22.7 | 0.2 |

From the test results shown in Table 11, it was expressed that the heat retention performance of a cloth formed by bonding a carbon-mixed film to a clothing cloth was higher by a difference of 5° C. at most than that of a cloth without bonding.

Next, a procedure for producing clothing using the functional fabric according to the present invention will be described.

FIG. 1 is a drawing illustrating a procedure for producing clothing including a functional fabric according to the present embodiment.

First, in producing the functional fabric, it is essential to create a synthetic resin film first, but in the process, a flow of melting of polyester chips (raw material pellets)→extruding→T-die method (unstretched)→winding→corona surface treatment→film thickness confirmation inspection→atypical product camera inspection→product storage, is formed. In particular, the most cautious thing in storing a synthetic resin film is to require a storage method such as hanging in the air without a load on an extremely thin synthetic resin film. When the synthetic resin film is bonded to a fabric, care should be taken not to create a cause of wrinkling, tearing, or breaking of the synthetic resin film. In addition, in order to maintain the state of the synthetic resin film which is unstretched in a width direction, the temperature is adjusted to 220° C. to 250° C., which is slightly lower than the thermal environment for ordinary fiber materials of 300° C., thereby obtaining a polyester resin film in which a polyester polymer array is composed of a crystalline region and a non-crystalline region more uniformly.

This synthetic resin film and the fabric are bonded together (bonding process work) using a polyurethane resin-containing binder at a coating amount of 7 g/m². In order to uniformly bond the synthetic resin film having a thickness of 10 to 20 μm to a fabric, 5 g/m² to 10 g/m² is optimal. When the coating amount is less than 5 g/m², a bind (adhesive strength) between the film and the fabric is insufficient and peeling-off is easy, and when the coating amount is more than 10 g/m², bonding strength increases, but the synthetic resin film becomes stiff, a variation in adhesive surfaces is likely to occur due to a binder, and the cloth texture of the clothes to which the synthetic resin film is bonded is also affected, resulting in deterioration in quality.

Finally, the functional fabric obtained by bonding the synthetic resin film is bonded to clothing such as outer clothing, intermediate clothing, and underwear, according to its use.

Hereinafter, description will be made using Examples and Comparative Examples.

EXAMPLE 1

PET chips mixed with 1% by weight of carbon black fine particles were melted at a temperature in a range of 200° C. to 220° C., and a sheet-like film was formed by a T-die method. The film was passed through a cooling roll at 20° C. to 25° C. to produce a thinner film coat by the T-die method. A film winding speed was 15 to 25 m/min.

Next, the synthetic resin film produced by the T-die method was bonded to a cloth by bonding processing, but the adhesive resin used was various resins such as a vinyl acetate resin, an acrylic ester resin, a vinyl chloride resin, an epoxy resin, and a silicon resin. Here, 7 g/m² of a polyurethane adhesive resin was used in consideration of cloth texture, elasticity, and stretchability. Furthermore, it is desirable to use a moisture curable polyurethane resin. Though it is possible to perform processing in a temperature range of 80° C. to 150° C., bonding processing was performed at 120° C.±5° C. Bonding processing is performed so as to maintain proper elasticity inherent to the cloth and the film adhered by dots so that the elasticity is not impaired.

The diameter of the carbon black fine particles mixed in the polyester chips is suitably in a range of 1/10 to 1/2 of an infrared/far-infrared wavelength from the application of a Rayleigh light scattering theory. Particles having a particle size in the range can re-reflect infrared and far-infrared rays generated from living organisms (including humans) most efficiently.

Incidentally, it is known that the wavelength of infrared rays is 0.78 μm to 1.5 μm, and the wavelength of far infrared rays is 3.0 μm to 1000 μm. Therefore, it is considered that the optimum particle size range of carbon black is 0.08 μm to 500 μm. However, since the particle size of carbon black actually produced by the furnace method is in a range of 3 to 500 nm, infrared rays and far infrared rays emitted from the body can be efficiently re-reflected by particles having any particle size.

Further, examples of a crystallization accelerator which can accelerate crystallization of the polyester polymer resin include a benzoic acid metal salt, an oxalic acid metal salt, a stearic acid metal salt, a high melting point PET, carbon black, a metal oxide, a metal sulfate, and the like. Crystals grow in order that the molecular chain of polyester (condensation polymer of terephthalic acid and ethylene glycol) is folded and arranged using these accelerator materials as a crystal nucleus (polymer orientation), leading to an increase in a crystal region (hard segment) in the polyester resin.

Further, on the contrary, the molten polyester polymer resin is cooled to its glass transition temperature or lower, thereby forming an amorphous plastic, that is, a segment (soft segment) which is in an amorphous region.

A structure which is a non-porous polyester synthetic resin film and passes moisture through the gap between the non-crystalline regions is completed. Water or air having a high molecular weight cannot be passed, but moisture (water vapor) level can be passed. A polyester film having so-called moisture-permeability, waterproof, and windproof functions is completed. Other polyester resin crystallization accelerators include fatty acid organic esters, triallyl phosphate, polyalkylene glycol, and derivatives thereof, but it is not necessary to newly add the accelerators for mixing the polyester film with carbon black.

The polyester chips containing carbon black were melted, and the melted polyester polymer was cooled by a cooling roll at the glass transition temperature or lower, so that the non-crystalline region can be formed well in the polyester resin film.

For the thus-obtained synthetic resin film, the thermal re-radiation characteristics of each film were described above as Data, by a 45° parallel re-radiation method which is a rule acknowledged by (one association) Far Infrared Rays Association.

Subsequently, predetermined fiber cloth and film were bonded together with a moisture curable polyurethane resin by bonding processing under a temperature environment of 120° C.±5° C.

A cloth formed by thinly raising a skin side (back side) of a fabric which was formed by smoothly knitting a 75d/144f ultra-fine fiber bundle thread was used as a cloth body for the body, one side of a fabric formed by smoothly knitting a 50/1 polyester spun yarn and a 50/1 blended yarn of 60% cotton and 40% polyester as a patch cloth was thinly raised, and the fabric on which a synthetic resin film mixed with carbon black was bonded was used only for a front body to make a long-sleeved round-neck T-shirt.

EXAMPLE 2

A cloth formed by thinly raising a skin side (back side) of a fabric which was formed by smoothly knitting a 75d/144f ultra-fine fiber bundle thread was used as a cloth body for the body, one side of a fabric formed by smoothly knitting a 50/1 polyester spun yarn and a 50/1 blended yarn of 60% cotton and 40% polyester as a patch cloth was thinly raised, and the fabric on which a synthetic resin film mixed with carbon black was bonded was used only for a front body to make a long-sleeved high-neck T-shirt.

EXAMPLE 3

One back side of bare Tenjiku fabric of Jersey stitch formed by plating knitting a 75d/144f ultra-fine fiber bundle thread and a 20d polyurethane yarn was thinly raised and used as a cloth body for the body, a synthetic resin film mixed with carbon black was bonded to a fabric obtained by smoothly knitting a 50/1 polyester spun yarn and a 50/1 blended yarn of 60% cotton and 40% polyester, and the fabric was bonded only to the front of both knees at the bottom (bonding processing) to make front opening half tights.

EXAMPLE 4

One back side of bare Tenjiku fabric of Jersey stitch formed by plating knitting a 75d/144f ultra-fine fiber bundle thread and a 20d polyurethane yarn was thinly raised and used as a cloth body for the body, a synthetic resin film mixed with carbon black was bonded to a fabric obtained by smoothly knitting a 50/1 polyester spun yarn and a 50/1 blended yarn of 60% cotton and 40% polyester, and the fabric was bonded only to the front of both knees at the bottom (bonding processing) to make front opening long tights.

Comparative Example 1

Considering the transparency of the film, PET chips mixed with 5 to 6% titanium oxide fine particles were melted at a temperature in a range of 200 to 220° C.

Other Comparative Examples

The following table shows the results of differences between the present Examples 1 to 4 and existing products confirmed by consumers and the like.

TABLE 12

| | Bonding Example | Inner clothing | Intermediate clothing Compression | Existing outer clothing | |
| --- | --- | --- | --- | --- | --- |
| | Products of invention | Existing underwear | inner | Windbreaker | Down jacket |
| Waterproof property | ○ | X | X | ○ | ○ |
| Windproof property | ⊙ | X | X | ⊙ | ○ |
| Heat retention | ⊙ | ○ | Δ | X | ⊙ |
| Moisture permeability | ○ | ⊙ | ○ | X | X |
| Durability | ○ | ○ | ○ | ○ | Δ |

TABLE 12-continued

| Bonding Example | Inner clothing | Intermediate clothing Compression | Existing outer clothing | |
|---|---|---|---|---|
| Products of invention | Existing underwear | inner | Windbreaker | Down jacket |
| Drying property | ⊙ | ○/Δ (By cloth) | ○ | ○ | ○ |
| Texture | ⊙ | ⊙/○ (By cloth) | Δ | X | X |
| Ease of movement | ⊙ | ○ | ⊙ | X | X |

Thus, good evaluations were obtained in Examples 1 to 4.

EXAMPLE 5

One back side of bare Tenjiku fabric of Jersey stitch formed by plating knitting a 75d/144f ultra-fine fiber bundle thread and a 20d polyurethane yarn was thinly raised and used as a cloth body for the body, and a synthetic resin film having a thickness of 18 μm mixed with carbon black was bonded to a fabric obtained by smoothly knitting a 50/1 blended yarn of 60% cotton and 40% polyester to create Fabric A. Similarly, a synthetic resin film having a thickness of 15 μm mixed with carbon black was bonded to the fabric to create Fabric B. Test results of moisture permeability and windproof properties for Fabric A and Fabric B are shown below.

TABLE 13

| Item | Test method | Fabric A (18 μm) | Fabric B (15 μm) |
|---|---|---|---|
| Moisture permeability (g/m² · h) | JIS L-1099 A1 method | 137 | 161 |
| Moisture permeability (cm³/m²/sec) | JIS L-1099 B2 method | 159 | 176 |
| Air permeability (cm³/cm²/sec) | JIS L-1096 A method (Fragile method) | Less than 0.3 | Less than 0.3 |

In both cases, there was no change in that for the air permeability, air hardly passes, but from the test results in Table 13, it can be seen that there is a difference in that the moisture permeability performance of Fabric B to which the synthetic resin film of 15 μm was bonded was improved by 10% or more as compared with Fabric A to which the synthetic resin film of 18 μm was bonded.

As described above, the functional fabric according to the present invention has been described based on the embodiment, but the present invention is not limited thereto, and various design changes are possible within the range in which the object of the present invention can be achieved and without departing from the gist of the invention, and all are included within the scope of the present invention.

INDUSTRIAL APPLICABILITY

The functional fabric according to the present invention is useful as a fabric having windproof, waterproof, moisture permeability, and heat retention functions, and when the fabric is used, it is suitable not only for clothing worn in daily life, but also for clothing such as mountain-climbing wear and sportswear.

The invention claimed is:

1. A functional fabric comprising a fabric and a synthetic resin film bonded to the fabric, the synthetic resin film being made of polyethylene terephthalate (PET) and mixed with carbon black fine particles,
   the particle size range of carbon black fine particles is 80 nm to 500 nm, and
   the synthetic resin film is non-porous, and has a non-crystalline region formed by melting polyester chips containing the PET and 1% by weight of carbon black fine particles to form a melted polyester polymer, the melted polyester polymer forming a sheet-like film by a T-die method, passing the sheet-like film of the melted polyester polymer through a cooling roll at 20° C. to 25° C. to produce a thinner film coat by the T-die method, and cooling the melted polyester polymer at the glass transition temperature or lower to thereby create the non-crystalline region in the synthetic resin film, and is adhered to the fabric by dots of an adhesive resin.

2. The functional fabric according to claim 1, wherein the synthetic resin film has a thickness of 10 μm to 20 μm.

3. The functional fabric of claim 1, wherein the adhesive resin is present in 5 g/m² to 10 g/m².

4. A method for producing a functional fabric, the method comprising:
   producing a synthetic resin film being made of polyethylene terephthalate (PET) and mixed with carbon black fine particles;
   bonding the synthetic resin film to a fabric by dots of an adhesive resin, with the producing a non-porous synthetic resin film, with the particle size range of carbon black fine particles is 80 nm to 500 nm, and the synthetic resin film's thickness of 10 μm to 20 μm; and
   forming a non-crystalline region by melting polyester chips containing the PET and 1% by weight of carbon black fine particles to form a melted polyester polymer forming a sheet-like film by a T-die method, passing the sheet-like film of the melted polyester polymer through a cooling roll at 20° C. to 25° C. to produce a thinner film coat by the T-die method to thereby create non-crystalline regions in the synthetic resin film, and cooling the melted polyester polymer at the glass transition temperature or lower.

5. The method of claim 4, wherein the adhesive resin is present in 5 g/m² to 10 g/m².

6. A clothing comprising a functional fabric including a fabric and a synthetic resin film bonded to the fabric by dots of an adhesive resin, the synthetic resin film being made of polyethylene terephthalate (PET) and mixed with carbon black fine particles,
   the particle size range of carbon black fine particles is 80 nm to 500 nm;
   the synthetic resin film is non-porous, and has a thickness of 10 μm to 20 μm and a non-crystalline region formed by melting polyester chips containing the PET and 1% by weight of carbon black fine particles to form a melted polyester polymer, the melted polyester polymer forming a sheet-like film by a T-die method, passing the sheet-like film of the melted polyester polymer through a cooling roll at 20° C. to 25° C. to produce a thinner film coat by the T-die method to thereby create non-crystalline regions in the synthetic resin film, and cooling the melted polyester polymer at the glass transition temperature or lower; and an inner wear or an intermediate clothes to which the functional fabric is entirely or partially bonded.

7. The clothing of claim 6, wherein the adhesive resin is present in an amount of 5 $g/m^2$ to 10 $g/m^2$.

\* \* \* \* \*